United States Patent
Sandy et al.

(10) Patent No.: US 12,091,605 B2
(45) Date of Patent: Sep. 17, 2024

(54) DEMETALLIZED SLAG FOR ABRASIVES AND/OR ROOFING GRANULES AND RELATED METHODS

(71) Applicant: HARSCO TECHNOLOGIES LLC, Fairmont, MN (US)

(72) Inventors: Brandon Sandy, Camp Hill, PA (US); Dominic Deangelo, Camp Hill, PA (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 0 days.

(21) Appl. No.: 17/229,944

(22) Filed: Apr. 14, 2021

(65) Prior Publication Data

US 2022/0332994 A1  Oct. 20, 2022

(51) Int. Cl.
| | | |
|---|---|---|
| *B23C 1/08* | (2006.01) | |
| *B02C 13/14* | (2006.01) | |
| *B02C 23/12* | (2006.01) | |
| *B02C 23/14* | (2006.01) | |
| *B24C 1/08* | (2006.01) | |

(Continued)

(52) U.S. Cl.
CPC ............ *C09K 3/1427* (2013.01); *B02C 13/14* (2013.01); *B02C 23/12* (2013.01); *B02C 23/14* (2013.01); *B24C 1/086* (2013.01); *C21D 7/06* (2013.01); *B01J 2/00* (2013.01)

(58) Field of Classification Search
CPC ............................. C04B 18/141; C04B 18/142
See application file for complete search history.

(56) References Cited

U.S. PATENT DOCUMENTS

| | | |
|---|---|---|
| 1,947,488 A | 2/1934 | Newhouse |
| 3,607,168 A | 9/1971 | Grady |

(Continued)

FOREIGN PATENT DOCUMENTS

| | | |
|---|---|---|
| CN | 104307614 B | 1/2015 |
| CN | 210115135 | 2/2020 |

(Continued)

OTHER PUBLICATIONS

Machine translation KR 20100117953 A (Year: 2010).*

(Continued)

*Primary Examiner* — Alexandre F Ferre
(74) *Attorney, Agent, or Firm* — Norton Rose Fulbright US LLP

(57) ABSTRACT

Some methods for making a granular material comprise crushing demetallized slag particles with one or more crushers and screening the crushed demetallized slag particles with one or more screens to separate the demetallized slag particles into two or more fractions, the granular material comprising at least one of the fractions of the demetallized slag particles. Prior to the crushing, ones of the demetallized slag particles having a size that is less than or equal to 2 inches can account for at least 90% of the demetallized slag particles. An iron-compound content of the demetallized slag particles, by weight, can be less than or equal to 10%. Crushing and screening can be performed such that ones of the demetallized slag particles of the granular material having a size that is less than or equal to 1.25 mm account for at least 90% of the demetallized slag particles of the granular material.

19 Claims, 10 Drawing Sheets

(51) Int. Cl.
  *C09K 3/14* (2006.01)
  *C21D 7/06* (2006.01)
  *B01J 2/00* (2006.01)

(56) References Cited

U.S. PATENT DOCUMENTS

| | | | |
|---|---|---|---|
| 3,645,708 | A | 2/1972 | Grady |
| 3,677,728 | A | 7/1972 | Kitaigorodsky |
| 3,879,214 | A | 4/1975 | Lowe et al. |
| 3,883,997 | A | 5/1975 | Burlingame |
| 4,062,672 | A | 12/1977 | Kunicki et al. |
| 5,865,872 | A | 2/1999 | Krofchak et al. |
| 9,334,548 | B2 | 5/2016 | Kim et al. |
| 9,435,005 | B2 | 9/2016 | Metsarinta et al. |
| 2006/0207289 | A1 | 9/2006 | Hale |
| 2008/0087136 | A1 | 4/2008 | Ek |
| 2008/0250899 | A1 | 10/2008 | Mecchi |
| 2010/0170421 | A1 | 7/2010 | Nguyen et al. |
| 2011/0072935 | A1* | 3/2011 | Gillis ............ B03C 1/14 75/10.67 |
| 2015/0101257 | A1* | 4/2015 | Tsubone ......... B24C 11/00 51/308 |
| 2017/0137912 | A1 | 5/2017 | Santiago et al. |
| 2017/0349484 | A1 | 12/2017 | Baumgartenn |
| 2018/0057911 | A1 | 3/2018 | Mathias et al. |

FOREIGN PATENT DOCUMENTS

| | | | | |
|---|---|---|---|---|
| CN | 111747669 | | 10/2020 | |
| DE | 10035161 | C1 | 11/2001 | |
| EP | 0116272 | A2 * | 8/1984 | |
| EP | 1325897 | A1 * | 7/2003 | ........... C04B 18/141 |
| EP | 1749804 | | 2/2007 | |
| JP | 2001 047365 | | 2/2001 | |
| JP | 4515214 | B2 | 7/2010 | |
| KR | 20070105017 | | 10/2007 | |
| KR | 20100117953 | A * | 11/2010 | ......... C04B 20/0076 |
| WO | WO-2006085712 | A1 * | 8/2006 | ............. B24C 11/00 |
| WO | 3186403 | | 3/2016 | |

OTHER PUBLICATIONS

Menad et al. (New EAF Slag Characterization Methodology for Strategic Metal Recovery, Materials 2021, 14, 1513), (Year: 2021).*
Zuo et al. (Effects of MnO on slag viscosity and wetting behavior between slag and refractory, Ironmaking and Steelmaking, 2015, 43). (Year: 2015).*
Machine translation EP116272 (Year: 2023).*
International Search Report and Written Opinion in corresponding PCT Application No. PCT/IB2022/053391, mailed Jul. 8, 2022.

* cited by examiner

465

DEMETALLIZED SLAG FOR ABRASIVES AND/OR ROOFING GRANULES AND RELATED METHODS

FIELD OF INVENTION

The present invention relates generally to systems and processes for demetallizing and crushing slag, and, more specifically, to systems and processes for producing demetallized crushed slag which may act as blast media or roofing material.

BACKGROUND

Slag is an industrial byproduct of the metal-making process that typically includes metal oxides and silicon dioxide. Different slags can be produced (1) when making different metals or (2) at different steps in the metal-making process. Some slags can be reused in other applications, such as in cement to increase the strength and chemical resistance thereof. However, not all slags are suitable for processing for reuse.

In abrasive blasting, blast media is typically expelled under high pressure to smoothen or roughen a surface, remove surface contaminants, and/or the like. Coal slag (i.e., slag resulting from a coal-burning process, sometimes also known as boiler slag) is sometimes used as a blast media in abrasive blasting. Coal slag is considered a high performing and high value abrasive blasting media. Performance in abrasive blasting media is typically considered by price of the material relative to the cleaning rate of the abrasive blast media. However, coal slag-based media has been unable to keep up with market demand with the decrease in coal burning and increase in abrasive blasting industry needs. Copper slag (i.e., slag resulting from a copper-making process), steel grit, and silica are sometimes used as blast media in abrasive blasting as alternatives to coal slag abrasive media. However, copper slag alone cannot keep up with the increasing market demand, and additional alternatives are required. Particularly, availability of copper slag-based media is limited in the United States, as one example.

Copper slag is also sometimes used as a granule in asphalt roofing shingles, although its use is limited relative to other granule materials. Quarried rock, for example, is the most common roofing granule used with asphalt roofing shingles. However, quarried rock can be heavy and have inconsistent particle sizes that detrimentally affect roofing quality. The high weight of shingles comprising such rock granules can yield high shipping costs, rendering the shingles less cost-effective when used for structures located far from a quarry.

SUMMARY

There accordingly is a need in the art for (1) blast media that satisfies customer demand for high quality blast media to supplement or replace coal slag, and (2) cost-effective roofing granules for asphalt shingles that have a consistent particle size. Some of the present slags—and methods and materials made from the same—address these needs via the demetallizing and processing thereof.

The slag can be a furnace slag (e.g., can be from the furnace in the metal-making process) that preferably is from a steel-making process (e.g., is steel slag). The steel furnace slag, for example, can be obtained from an electric arc furnace (EAF) and can comprise larnite ($\beta$-dicalcium silicate), srebrodolskite (calcium iron oxide), brownmillerite (calcium aluminum iron oxide), spinel, wustite (iron (II) oxide), manganese oxide, magnesium oxide, gehlenite (calcium aluminum silicate), and/or bredigite (calcium magnesium silicate). To better facilitate the production of effective blast media and roofing granules, the slag can be substantially free of ladle slag (e.g., slag from the steel refining process downstream of the ladle metallurgical furnace or LMF).

The slag can be demetallized (e.g., using a magnet) such that an iron-compound content (e.g., content of metallic iron and/or of one or more iron oxides) of the demetallized slag, by weight, is less than or equal to 10%, optionally less than or equal to 5% or 1%. The slag can also be crushed and screened to facilitate later process steps; for example, the particles of the demetallized slag can be separated into two or more fractions that include a first fraction in which ones of particles having a size that is less than or equal to 8 inches account for at least 90% of the particles of the first fraction. The fractions optionally include a second fraction in which ones of particles having a size that is less than or equal to 2 inches account for at least 90% of the particles of the second fraction and/or a third fraction in which ones of particles having a size that is less than or equal to 0.75 inches account for at least 90% of the particles of the third fraction. As used herein, a size of a particle can be the equivalent diameter of the particle if modelled as a sphere.

Some methods comprise crushing and screening the demetallized slag further, which can yield a granular material suitable for use as an abrasive blast media and/or roofing granules. The crushing and screening can be performed such that a size of the demetallized slag particles in the granular material is between No. 16 and No. 100 Mesh US. For example, ones of the crushed and/or screened demetallized slag particles having a size that is less than or equal to any one of, or between any two of, 2, 1.8, 1.6, 1.4, 1.2, 1.0, 0.8, 0.6, 0.2, 0.19, 0.18, 0.17, 0.16, 0.15, or 0.14 millimeters (mm) (e.g., between 0.14 and 1.25 mm) can account for at least 90% of the granular material's particles.

Such demetallized slag particles may be advantageous in blast media and roofing applications. The particles can be included in a blast media (optionally with a sand blast media) for abrasive blasting (e.g., in which the particles are impacted against a surface). The mechanical crushing of the solid slag can allow the particles to have an angular morphology that can yield faster material removal during blasting compared to existing media having a spherical morphology.

For roofing, demetallized slag particles can be included in a roofing substrate (e.g., an asphalt substrate) having opposing first and second sides, the particles disposed on the first side of the substrate. The roofing material can be, for example, a shingle or roll. The slag particles, due to their angular morphology and size consistency, may yield a more consistent surface profile among different shingles and have better compatibility with asphalt.

Some of the present methods of making a granular material comprise crushing demetallized slag particles with one or more crushers. Prior to crushing, in some methods, ones of the demetallized slag particles having a size that is less than or equal to 2 inches account for at least 90% of the demetallized slag particles. In some methods, an iron-compound content of the demetallized slag particles, by weight, is less than or equal to 10%, optionally less than or equal to 5%. Some methods comprise screening the crushed demetallized slag particles with one or more screens to separate the demetallized slag particles into two or more fractions, the granular material comprising at least one of the fractions of the demetallized slag particles. In some methods, crushing and screening the demetallized slag particles is performed such that ones of the demetallized slag particles of the granular material having a size that is less than or equal to 1.25 mm, optionally less than or equal to 0.90 mm, account for at least 90% of the demetallized slag particles of the granular material.

In some methods, the one or more crushers comprise primary and secondary crushers. In some of such methods, crushing the demetallized slag particles comprises crushing at least one of the fractions of the screened demetallized slag particles with the secondary crusher. Screening the demetallized slag particles, in some of such methods, comprises screening the demetallized slag particles crushed with the secondary crusher. Each of the crusher(s), in some methods, comprises a vertical shaft impact crusher.

Some methods comprise drying the demetallized slag particles. Drying, in some methods, is performed such that less than or equal to 0.50% of the demetallized slag particles, by weight, comprises water. In some methods, drying is performed with a rotary dryer.

Some methods comprise making the demetallized slag particles. Making the demetallized slag particles, in some methods, includes removing one or more metallic components from furnace slag particles at least by passing the furnace slag particles through a demetallizer one or more times, crushing the furnace slag particles, and/or screening the crushed furnace slag particles with one or more screens to separate the crushed furnace slag particles into two or more fractions, the demetallized slag particles comprising at least one of the fractions. Making the demetallized slag particles includes, in some methods, after passing the furnace slag particles through the demetallizer at least once, screening the furnace slag particles with one or more screens to separate the furnace slag particles into two or more fractions, wherein optionally ones of the particles of a first one of the fractions having a size that is greater than or equal to 8 inches account for at least 90% of the particles of the first fraction. In some of such methods, removing the metallic component(s) includes passing the first fraction through the demetallizer. In some methods, removing the metallic component(s) is performed with one or more magnets of the demetallizer. In some methods, crushing the furnace slag is performed with a jaw crusher. The furnace slag, in some methods, comprises calcium oxide (CaO), iron (III) oxide ($Fe_2O_3$), silicon dioxide ($SiO_2$), aluminum oxide ($Al_2O_3$), magnesium oxide (MgO), and manganese (II) oxide (MnO). The demetallized slag particles, in some methods, comprise electric arc furnace steel slag.

Some of the present abrasive blast media comprise steel slag particles. Some of the present roofing materials comprise a substrate having opposing first and second sides and steel slag particles disposed on the first side of the substrate. In some embodiments, ones of the steel slag particles having a size that is less than or equal to 1.25 mm, optionally less than or equal to 0.90 mm, and greater than or equal to 0.14 mm account for at least 90% of the steel slag particles. In some embodiments, an iron-compound content of the steel slag particles, by weight, is less than or equal to 10%, optionally less than or equal to 5%. The steel slag particles, in some embodiments, comprise electric arc furnace slag. The steel slag particles, in some embodiments, comprise calcium oxide (CaO), silicon dioxide ($SiO_2$), aluminum oxide ($Al_2O_3$), magnesium oxide (MgO), and manganese (II) oxide (MnO).

For some abrasive blast media, in a cleaning process in which the abrasive blast media is ejected at a pressure of 100 pounds per square inch from a No. 4 blast nozzle positioned 18 inches away from a surface of a hot rolled carbon steel substrate that includes mill scale, the abrasive blast media is configured clean the surface of the hot rolled carbon steel (with intact mill scale) substrate at a cleaning rate of at least 135 square feet of the surface per hour ($ft^2/hr$), optionally at least 140 $ft^2$ hr such that the surface complies with SSPC-SP 10. In some of such embodiments, in the cleaning process the abrasive blast media is ejected from the nozzle at a consumption rate of between 6.0 and 7.0 pounds per minute (lb/min).

For some roofing materials, the substrate comprises asphalt. For some roofing materials, the roofing material is a shingle.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The terms "substantially" and "approximately" are each defined as largely but not necessarily wholly what is specified—and include what is specified; e.g., substantially or approximately 90 degrees includes 90 degrees and substantially or approximately parallel includes parallel—as understood by a person of ordinary skill in the art. In any disclosed embodiment, the terms "substantially" and "approximately" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," "include" and any form thereof such as "includes" and "including," and "contain" and any form thereof such as "contains" and "containing," are open-ended linking verbs. As a result, an apparatus that "comprises," "has," "includes," or "contains" one or more elements possesses or contains those one or more elements, but is not limited to possessing or containing only those elements. Likewise, a method that "comprises," "has," or "includes" one or more steps possesses those one or more steps, but is not limited to possessing only those one or more steps.

Each dimension herein provided in an English unit may be translated to the corresponding metric unit by rounding to the nearest millimeter.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
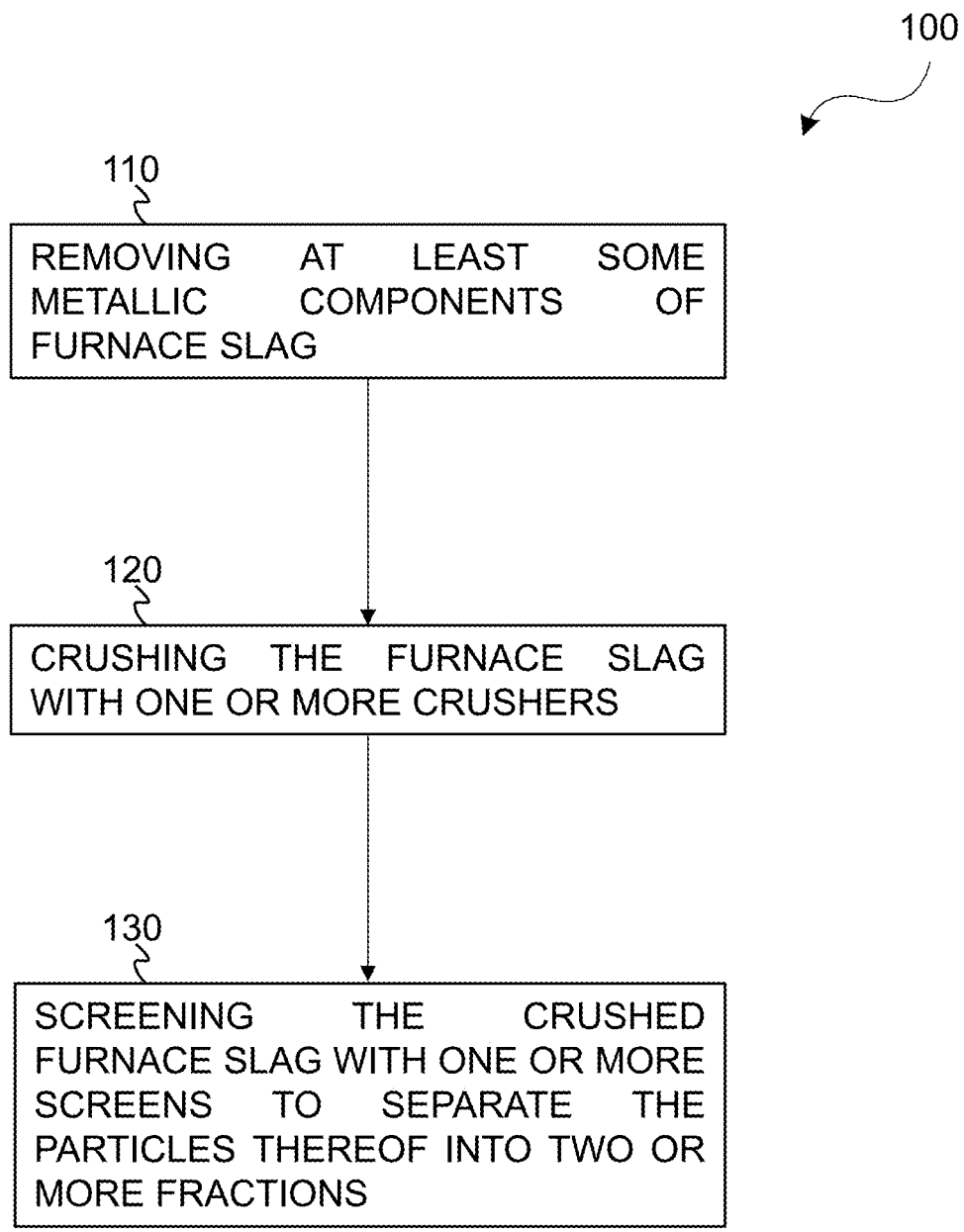
FIG. 1 is a flow chart illustrating demetallizing steps of some of the present methods.
Figure 2:
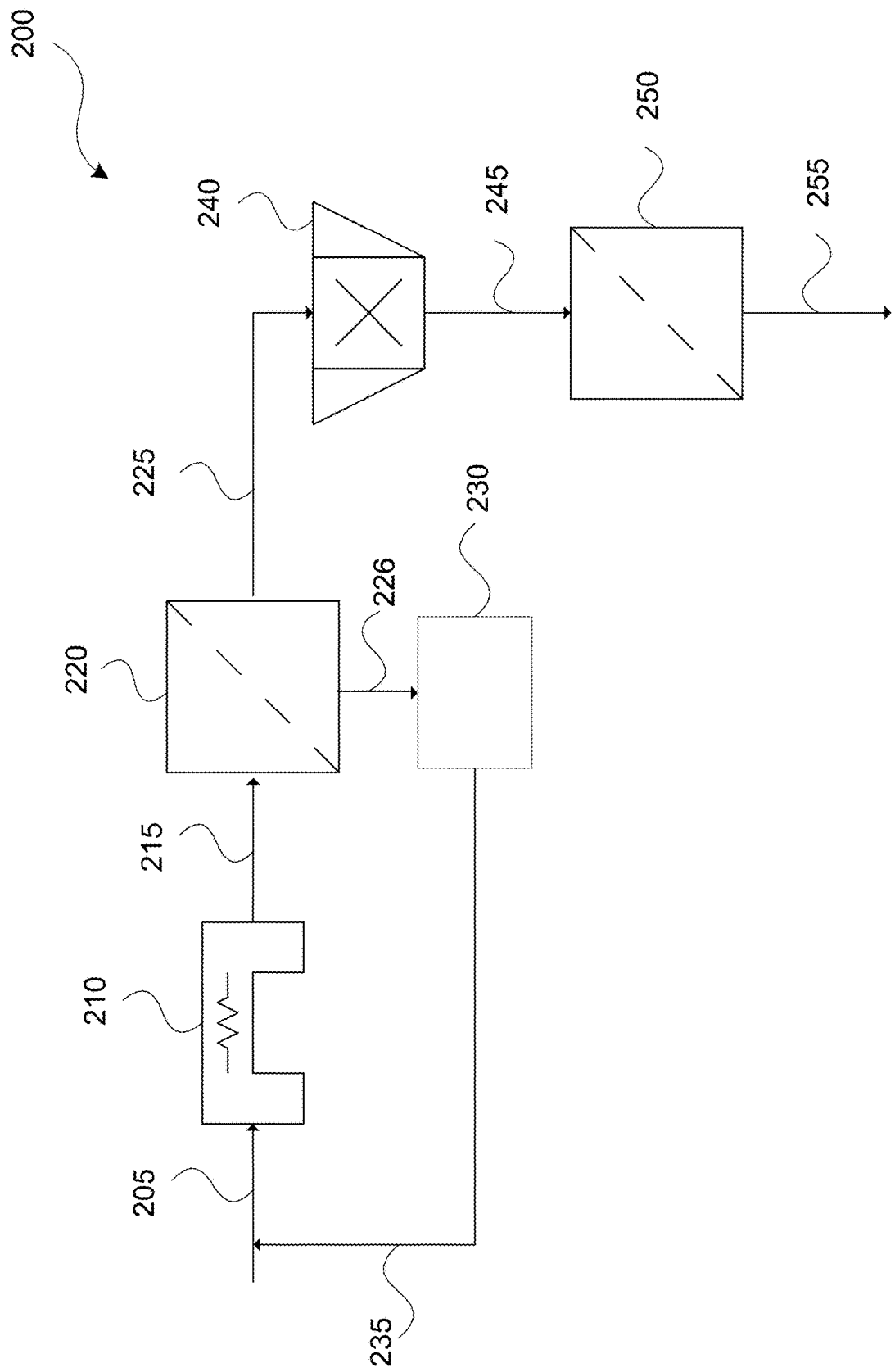
FIG. 2 is a schematic of a system that can be used to perform some of the steps of FIG. 1.

Referring to FIG. 1, shown are steps 100 of treating furnace slag having metallic components, and referring to FIG. 2 shown is an illustrative system 200 for performing the steps of FIG. 1. While some of the present methods are described with reference to system 200, system 200 does not limit the present methods, which can be performed with any suitable system.

Some of the present methods include a step 110 of removing at least some metallic components of the furnace slag (e.g., 205) to yield demetallized slag. The furnace slag can be, for example, steel slag—preferably carbon steel slag—and, optionally, can be from an electric arc furnace. To illustrate, the furnace slag (e.g., steel slag) can comprise calcium oxide (CaO), iron (III) oxide ($Fe_2O_3$), silicon dioxide ($SiO_2$), aluminum oxide ($Al_2O_3$), magnesium oxide (MgO), and/or manganese (II) oxide (MnO). For example, by weight, greater than or equal to any one of, or between any two of, 10%, 15%, 20%, 25%, or 30% of the furnace slag can comprise CaO, greater than or equal to any one of, or between any two of, 10%, 15%, 20%, 25%, 30%, 35%, 40%, or 45% of the furnace slag can comprise $Fe_2O_3$, greater than or equal to any one of, or between any two of, 5%, 10%, 15%, 20%, 25%, or 30% of the furnace slag can comprise $SiO_2$, greater than or equal to any one of, or between any two of, 1%, 4%, 8%, 12%, or 16% of the steel slag can comprise MgO, and/or greater than or equal to any one of, or between any two of, 1%, 4%, 8%, 12%, or 16 of the steel slag can comprise MnO. The steel slag's mineral phases that can comprise at least some of such compounds can include larnite (β-dicalcium silicate), srebrodolskite (calcium iron oxide), and/or wustite (iron (II) oxide). The steel slag can also comprise brownmillerite (calcium aluminum iron oxide), spinel, gehlenite (calcium aluminum silicate), and/or bredigite (calcium magnesium silicate). Other compounds the steel furnace slag can comprise include sodium oxide ($Na_2O$), phosphorous (V) pentoxide ($P_2O_5$), potassium oxide ($K_2O$), titanium dioxide ($TiO_2$), vanadium pentoxide ($V_2O_5$), chromium (III) oxide ($Cr_2O_3$), iron (II) oxide, copper (II) oxide (CuO), nickel oxide (NiO), zinc oxide (ZnO), strontium oxide (SrO), zirconium dioxide ($ZrO_2$), and/or barium oxide (BaO). Less than or equal to any one of, or between any two of, 10%, 9%, 8%, 7%, 6%, 5%, 4%, 3%, 2%, or 1% (e.g., less than or equal to 6.5%) of the steel furnace slag, by weight, can comprise such additional compound(s). In some instances, the steel slag may include other carbon, sulfur, and/or water. The furnace slag can be substantially free of ladle slag (e.g., by keeping any ladle slag apart from the furnace slag) to facilitate processing thereof for the production of effective blast media and/or roofing granules.

To remove metallic components, the furnace slag can be passed through a demetallizer (e.g., 210) one or more times. The demetallizer can include one or more magnets that can remove the metallic components from the furnace slag. For example, the demetallizer can comprise a conveyor having opposing first and second ends, the conveyor conveying the furnace slag from the first end to the second end. At the second end of the conveyor, the conveyor can include a magnetic pulley around which the conveyor's belt can pass and that comprises the magnet(s). A magnetic field of the magnetic pulley can affect a trajectory of iron-containing compounds (e.g., metallic iron and/or one or more iron oxides) falling off of the conveyor (e.g., by attracting the iron-containing compounds such that they fall underneath the conveyor) while non-magnetic compounds in the furnace slag remain unaffected, causing separation thereof. In some instances, the furnace slag can be spread out and swept with the magnet(s) (e.g., to remove skulls). The rate at which the furnace slag is fed through the demetallizer can be controlled to increase or decrease metallic removal, with slower feed rate allowing for more removal of metallic components. For example, the rate at which furnace slag is fed through the demetallizer can be less than or equal to any one of, or between any two of, 200, 175, 150, 125, 100, 75, or 50 tons of furnace slag per hour (e.g., less than or equal to 125 tons of furnace slag per hour).

The removal can be performed such that an iron-compound content (e.g., content of metallic iron and/or one or more iron oxides) of the demetallized slag, by weight, is less than or equal to any one of, or between any two of, 10%, 9%, 8%, 7%, 6%, 5%, 4%, 3%, 2%, or 1%. The iron-compound content can be measured using a mason jar water box test in which a sample of the demetallized slag is placed in a 1-quart mason jar having a cone lid (e.g., with the sample occupying approximately 75% of the jar's volume), distilled water is added to the jar such that the sample is submerged, the jar is tapped (e.g., to remove air pockets), more distilled water is added to the jar such that the water reaches the brim thereof, and the cone lid is screwed onto the brim and more distilled water is added to the jar through the cone lid opening such that a meniscus forms at the cone lid opening. During the final water addition, the water level may fall as water settles and air escapes through the lid opening; to address this, additional water is added such that the meniscus is positioned at the cone opening until the water level no longer drops. The weight of the sample can be determined before water is added thereto (e.g., by comparing the combined sample and jar (including lid) weight to the weight of the jar with its lid) and the weight of the water in the jar can be determined as well (e.g., by comparing the final combined water, sample, and jar (including lid) weight to the combined sample and jar (including lid) weight). Weights can be determined using a laboratory scale with a precision of at least 0.1 grams and a capacity of at least 2000 grams. From the sample and water weights, the iron-compound content can be calculated. To do so, the water volume can be calculated from the water weight (e.g., by dividing the water weight by 62.4 lbs/ft$^3$) and the volume of the sample can be calculated by subtracting the calculated water volume from the volume of the portion of the jar that contains the sample and water. Then, a theoretical 100%-iron-compound sample weight can be calculated by multiplying the sample volume by a density of an 100%-iron-compound material, such as 430 lbs/ft$^3$. From this, the difference between the theoretical 100%-iron-compound sample weight and the actual sample weight can be determined and the difference can be divided by a difference between the density of an 100%-iron-compound material (e.g., 430 lbs/ft$^3$) and a density of a 0%-iron-compound-content slag material (e.g., 160 lbs/ft$^3$) to yield a volume of the non-iron-compound portion of the sample. The volume of the non-iron-compound portion of the sample can be subtracted from the sample's total volume to yield a volume of the sample's iron-compound portion, which can be multiplied by the density of the 100%-iron-compound material (e.g., 430 lbs/ft$^3$) to determine the iron-compound weight in the sample. Dividing the sample's iron-compound weight by the sample's total weight yields the iron-compound content. Additionally or alternatively, the iron-compound content can be determined with a melt assay.

After passing the furnace slag through the demetallizer at least once, the furnace slag (e.g., 215) from the demetallizer can optionally be screened at a large-particle screening station (e.g., 220). At the large-particle screening station, the demetallized furnace slag can be run through one or more screens (e.g., one or more grizzly screens) to separate the particles thereof into two or more fractions. Ones of slag particles of a first one of the fractions (e.g., 226) having a size that is greater than or equal to 8 inches can account for at least 90% of the particles of the first fraction. The first fraction's particles can separated from the other fraction(s) and can be returned to a container (e.g., a slag pit). The stored particles may be crushed further in the container (e.g., as more slag is piled thereon) to yield smaller particles (e.g., 235). The smaller particles of the first fraction can be reintroduced through the demetallizer (e.g., with other slag particles from the container).

Some methods include a step 120 of crushing the demetallized furnace slag (e.g., 225). The slag can be crushed using a crusher (e.g., 240), such as a jaw crusher (e.g., a portable jaw crusher), to reduce the size of slag particles in the stream; other suitable mechanisms to perform the crushing include a cone crusher, vertical shaft impact crusher, and horizontal shaft impact crusher. While as shown crushing is performed after metallic components are removed in the demetallizer, in other embodiments crushing can be performed before and/or during metallic component removal, and/or the crushed demetallized slag may be fed through the demetallizer one or more additional times.

Some methods include a step 130 of screening the crushed, demetallized furnace slag particles (e.g., 245) with one or more screens (e.g., by passing the particles through another screening station (e.g., 250)) to separate them into two or more fractions. Through the screening, smaller demetallized slag particles (e.g., 255) can be segregated from larger ones, allowing the smaller particles to be used in later steps to make granular material for blasting media and/or roofing granules. For example, the crushed furnace slag particles can be screened such that ones of the smaller demetallized slag particles having a size that is less than or equal to 2 inches account for at least 90% of the smaller particles selected for further processing, regardless of whether the smaller slag particles include one of the fractions or multiple ones of the fractions. By way of illustration, for a first one of the fractions, ones of particles of the first fraction having a size that is greater than or equal to 8 inches can account for at least 90% of the particles of the first fraction, and, for a second one of the fractions, ones of particles of the second fraction having a size that is less than or equal to 2 inches can account for at least 90% of the particles of the second fraction. Optionally, for a third one of the fractions, ones of particles of the third fraction having a size that is less than or equal to 0.75 inches can account for at least 90% of the particles of the third fraction. The second and/or third fractions can be selected for further processing to make blast media and/or roofing granules, while the first fraction can be discarded or re-processed with the above-described demetallizing, screening, and/or crushing. In some embodiments, however, the first fraction can be processed further (e.g., if a crusher in addition to those described below is used).

Figure 3:
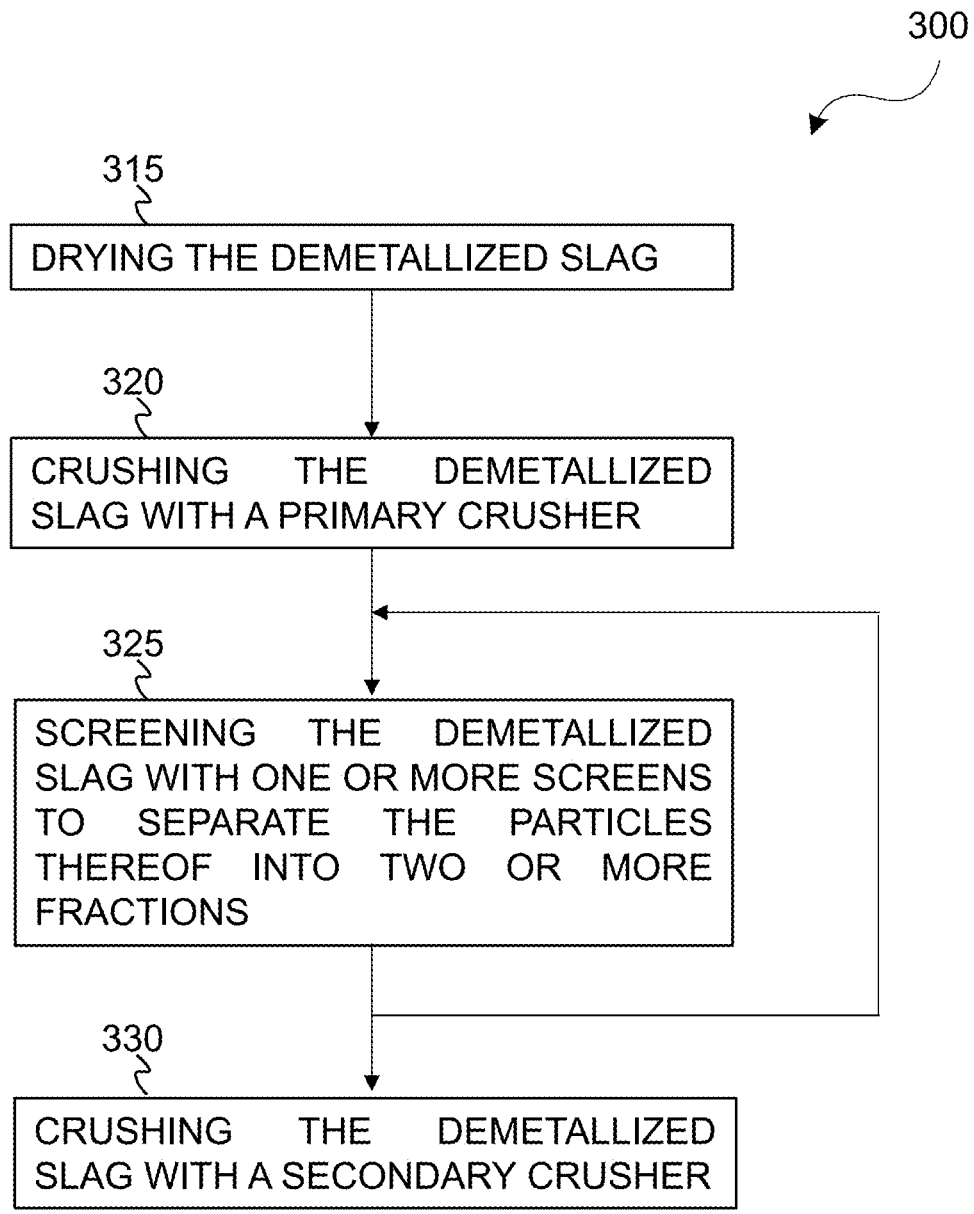
FIG. 3 is a flow chart illustrating post-demetallizing steps of some of the present methods to produce slag particles for blast media and/or roofing granules.
Figure 4:
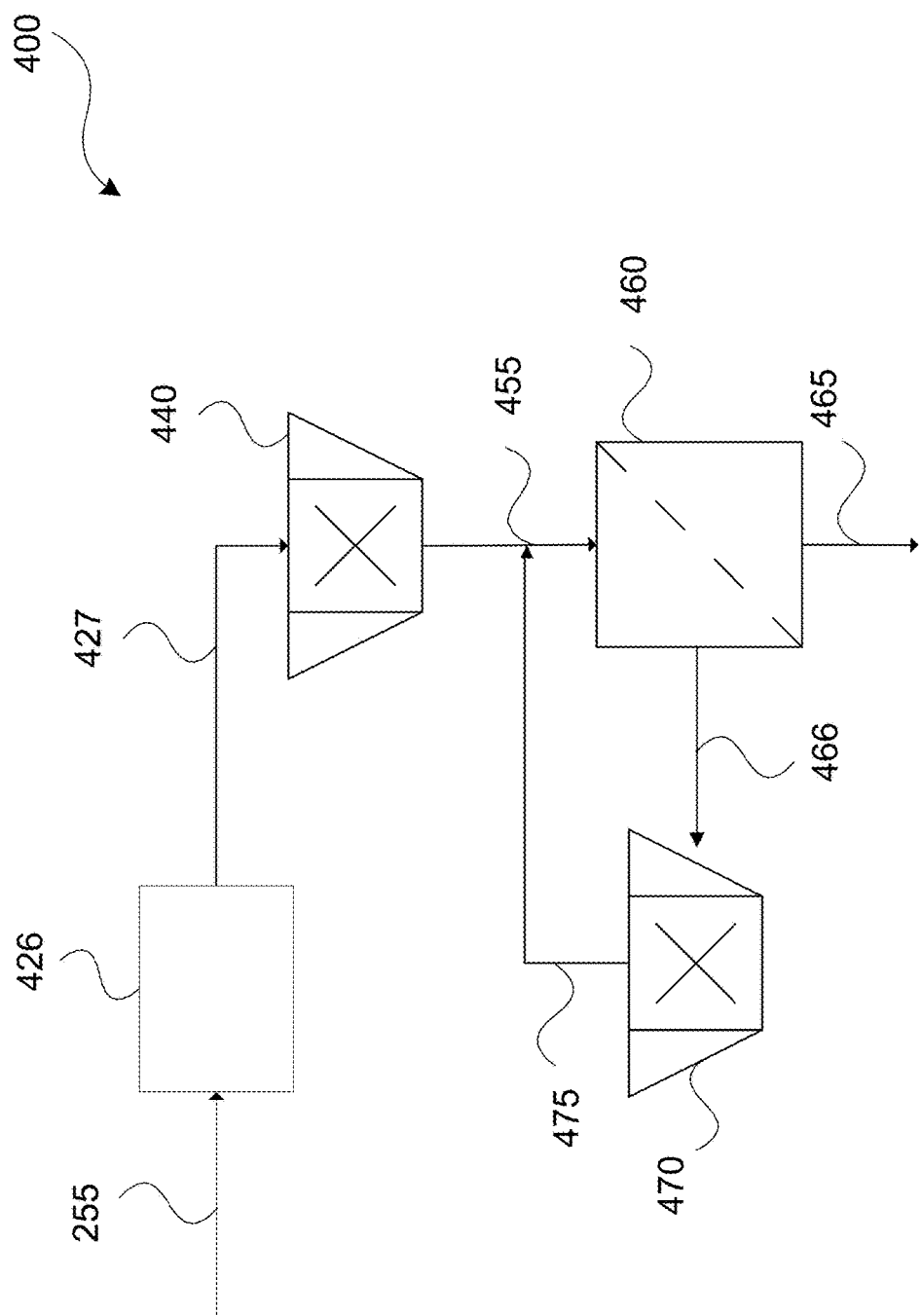
FIG. 4 is a schematic of a system that can be used to perform some of the steps of FIG. 3.

Referring to FIG. 3, shown are some of the present methods' steps 300 for post-demetallizing processing of the selected demetallized slag (e.g., 255) to produce a granular material (e.g., for blast media and/or roofing granules), and referring to FIG. 4 shown is an illustrative system 400 that can be used to perform the steps of FIG. 3. While some methods are described with reference to system 400, system 400 is not limiting on the present methods, which can be performed with any suitable system.

As shown, some methods optionally include a step 315 of drying the selected demetallized slag, which can remove excess moisture to yield better product quality. Drying can be performed with, for example, a rotary dryer (e.g., 426) to yield dried particles (e.g., 427). As a result of the drying, less than or equal to any one of, or between any two of, 1.0%, 0.9%, 0.8%, 0.7%, 0.6%, 0.5%, 0.4%, 0.3%, 0.2%, or 0.1% (e.g., less than or equal to 0.5%) of the selected demetallized slag particles, by weight, can comprise water.

The selected slag particles can be crushed with one or more—optionally two or more— crushers (e.g., 440 and 470), which can each comprise a vertical shaft impact crusher; however, other crushers can be used, such as any of those described above. In some methods, crushing includes a step 320 of crushing the selected demetallized slag particles (e.g., after drying thereof) with a primary crusher (e.g., 440). Furthermore, some methods include a step 325 of screening the crushed demetallized slag particles with one or more screens (e.g., 460) to separate the particles into two or more fractions, the granular material (e.g., 465) comprising at least one of the fractions. In some methods, crushing the selected slag particles optionally includes a step 330 of crushing at least one of the fractions (e.g., 466) of the screened demetallized slag particles with a secondary crusher (e.g., 470); the particles (e.g., 475) crushed with the secondary crusher can be screened again. In some aspects, ones of particles having a size that is less than or equal to any one of, or between any two of, 0.6, 0.5, 0.4, 0.3, 0.2, 0.1, 0.05, or 0.04 inches (e.g., between 0.05 and 0.5 inches) can account for at least 90% of the particles of the fraction crushed with the secondary crusher. For example, the particles crushed with the secondary crusher can be those that do not pass through a 9 Mesh Tyler or 10 Mesh US and have a size that is less than or equal to approximately 0.079 inches.

Crushing (e.g., with the primary crusher and, optionally, the secondary crusher) and screening can be performed to yield a granular material having demetallized slag particles whose size is suitable for use as an abrasive media and/or roofing granules. The resulting particles can be relatively fine; for example, a size thereof can be less than or equal to any one of, or between any two of, No. 16, No. 18, No. 20, No. 24, No. 30, No. 36, No. 40, No. 46, No. 54, No. 60, No. 70, or No. 80 Mesh US (e.g., between No. 16 and No. 70 Mesh US or between No. 20 and No. 100 Mesh US). To illustrate, ones of particles having a size that is less than or equal to any one of, or between any two of, 2, 1.8, 1.6, 1.4, 1.2, 1.0, 0.8, 0.6, 0.2, 0.19, 0.18, 0.17, 0.16, 0.15, or 0.14 mm (e.g., less than or equal to 1.25 mm, such as between 0.20 and 1.25 mm, or less than or equal to 0.90 mm, such as between 0.14 and 0.90 mm) can account for at least 90% of the particles.

Figure 5:
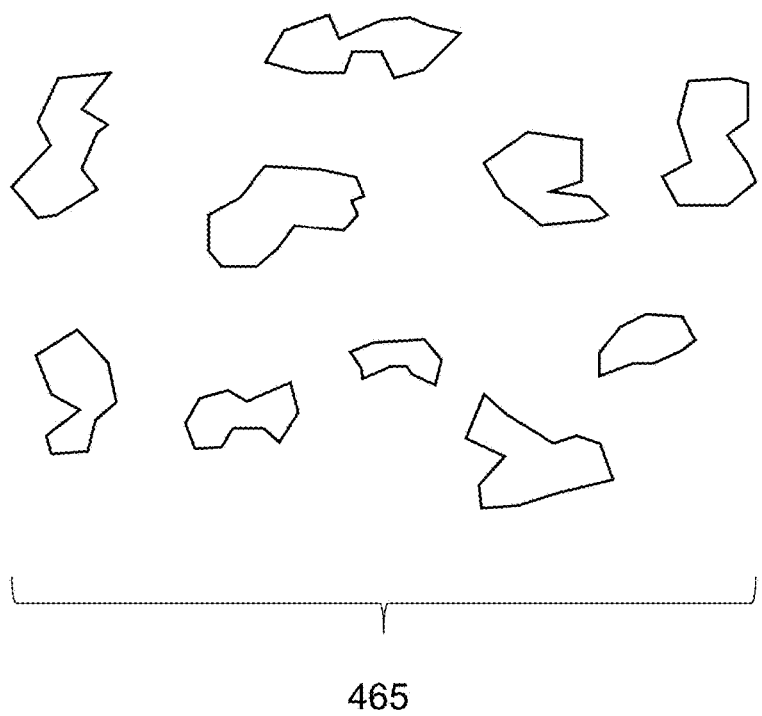
FIG. 5 is a schematic illustration of demetallized slag particles of some of the present granular materials.

Referring to FIG. 5, some of the present abrasive blast media comprise demetallized slag particles 465 as made and described above. Demetallized slag particles 465 made in the above-described manner can have an angular morphology due to the mechanical crushing thereof. The angular morphology can promote blast media efficacy (e.g., higher cleaning rates during abrasive blasting) and the structural integrity of particles 465, which can mitigate granule breakdown during blasting (e.g., to allow for reuse) and the production of dust. To illustrate, a cleaning rate achievable with the abrasive blast media can be greater than or equal to any one of, or between any two of, 135, 140, 145, 150, 155, 160, 165, or 170 square feet per hour (e.g., greater than or equal to 140 square feet per hour), and/or a consumption rate (e.g., of air through a nozzle through which the media is ejected) achievable with the abrasive blast media can be greater than or equal to any one of, or between any two of, 6.0, 6.30, 6.60, 6.90, 7.20, or 7.50 pounds per minute (e.g., greater than or equal to 6.30 pounds per minute). High value products are low in cost but high in efficacy, such as having a high cleaning rate and/or high consumption rate. Furthermore, a granule breakdown rate of the abrasive blast media can be less than or equal to any one of, or between any two of, 50%, 45%, 40%, 35%, or 30%, allowing for reuse thereof. Such characteristics may be achievable when, for example, obtaining an SSPC-SP 10 blast appearance on an 8-square-foot hot rolled carbon steel substrate with mill scale on the surface thereof, using a No. 4 blast nozzle (orifice size ¼ inch), a nozzle pressure of 100 pounds per square inch (psi), a blasting distance of 18 inches (e.g., 18 inches between the nozzle and substrate), and 50 pounds of blast media.

Some of the present methods include blasting a substrate (e.g., a steel substrate) with any of the present abrasive blast media. The blasting can include directing the abrasive blast media out of a nozzle such that the media impacts a surface of the substrate, such as at a pressure that is greater than or equal to any one of, or between any two of, 60, 70, 80, 90, 100, 110, 120, 130, or 140 psi. A distance between the nozzle and the substrate can be greater than or equal to any one of, or between any two of, 10, 12, 14, 16, 18, 20, 22, 24, or 26 inches. Blasting can be performed such that an appearance of the substrate complies with SSPC-SP 10, with any of the above-described cleaning rates, consumptions rates, and granule breakdown rates being used during the blasting.

Figure 6:
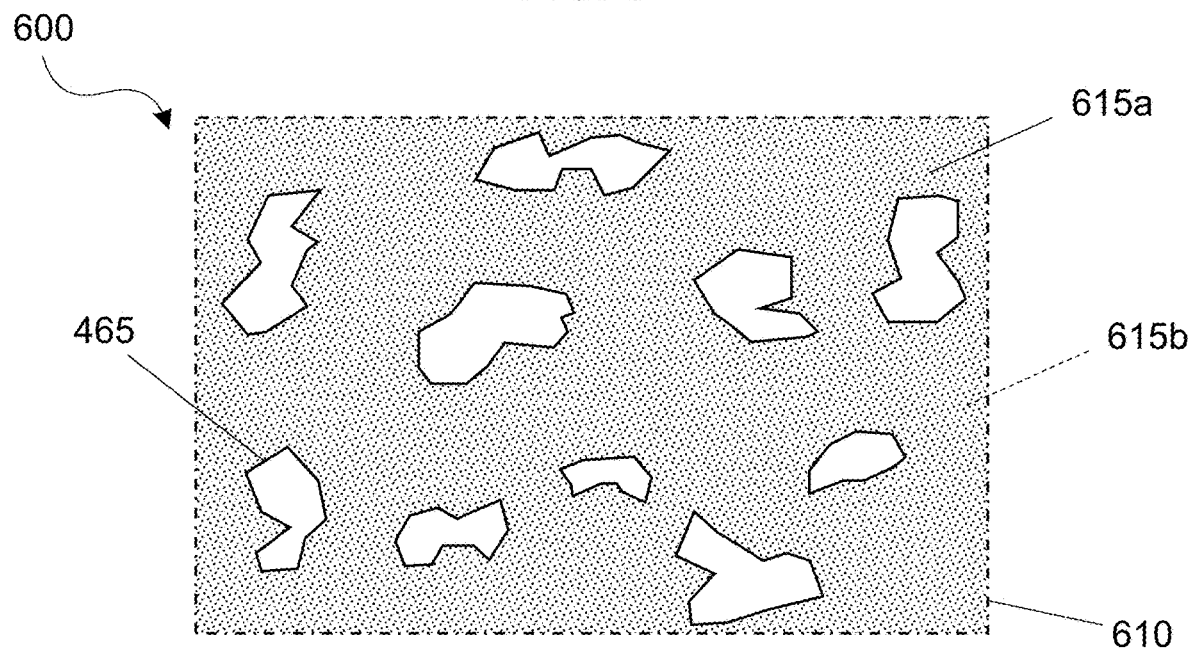
FIG. 6 is a schematic illustration of a portion of one of the present roofing shingles comprising demetallized slag particles on an asphalt substrate.

Referring to FIG. 6, shown is a roofing material 600 that can also comprise demetallized slag particles 465 as made and described above. Roofing material 600 can comprise, for example, a substrate 610 having opposing first and second sides 615a and 615b, demetallized slag particles 465 disposed on the first side of the substrate. Roofing material 600 can be a shingle, with substrate 610 optionally comprising asphalt. The above-described demetallized slag particles 465 may have better compatibility with asphalt than conventional roofing granules, and may facilitate a consistent distribution thereof over substrate 610's first surface 615a.

EXAMPLES

The present invention will be described in greater detail by way of specific examples. The following examples are offered for illustrative purposes only and are not intended to limit the invention in any manner. Those of skill in the art will readily recognize a variety of noncritical parameters that can be changed or modified to yield essentially the same results.

Example 1

Abrasive Media Comprising Demetallized Steel Slag

Two abrasive media made from steel slag were produced according to some of the present methods: "Media A" and "Media B." The Media A particles had a size that was between No. 20 and No. 100 Mesh US and the Media B particles had a size that was between No. 16 and No. 80 Mesh US. Certain characteristics of Media A and Media B were compared to those of other blasting media, based on an abrasive blasting trial in which, for each media tested, an 8-square-foot area of hot rolled carbon steel substrate with mill scale on the surface thereof was blasted using 50 pounds of the media emitted through a #4 blast nozzle positioned 18 inches away from the substrate at a pressure of 100 psi. Each media was tested three times and the results were averaged.

Figure 7:
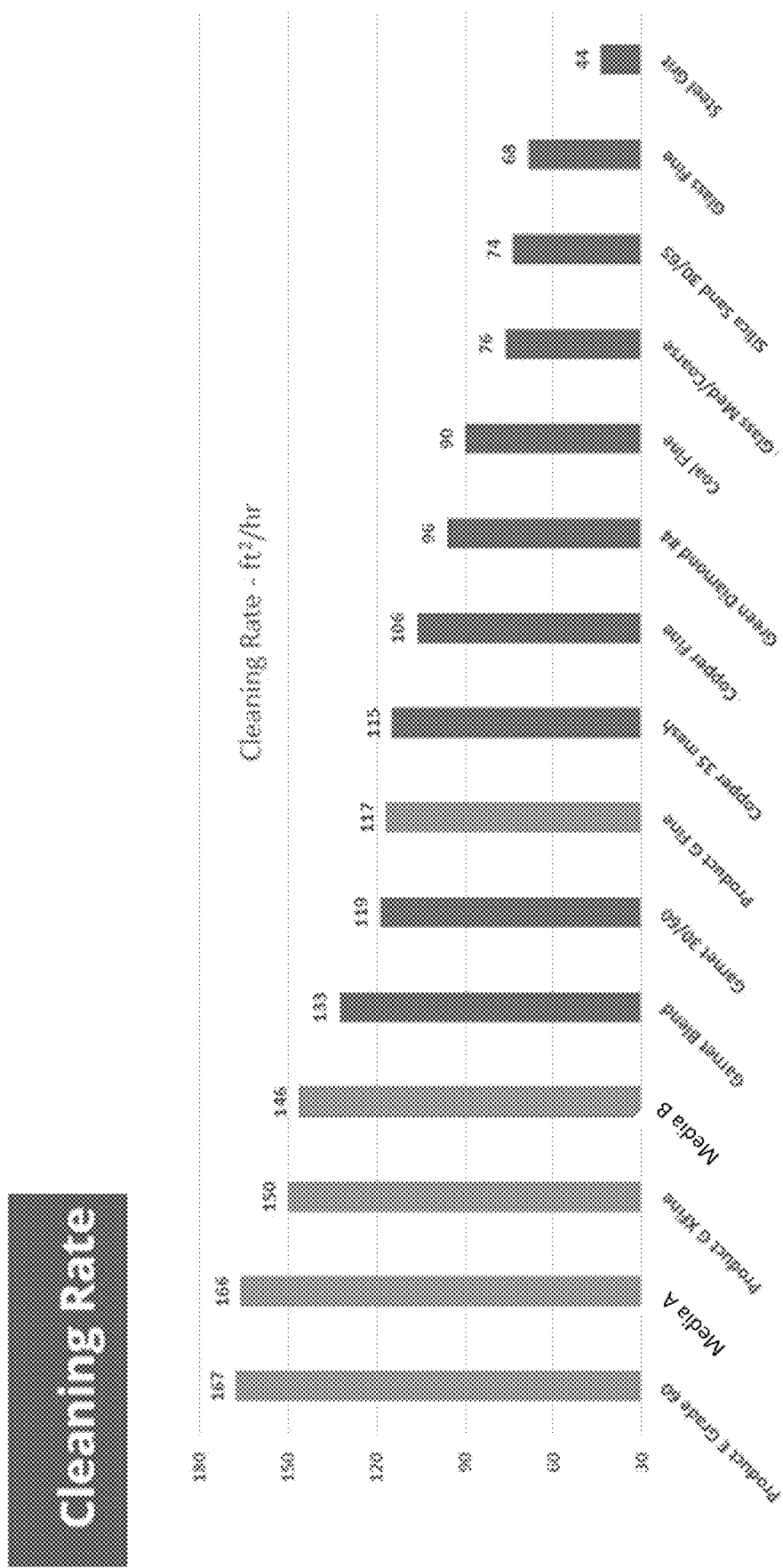
FIG. 7 is a diagram showing the cleaning rate of some of the present blasting media compared to that of existing blast media.

Referring to FIG. 7, one characteristics tested was cleaning rate. As shown, Media A and Media B achieved cleaning rates of 166 $ft^2$/hr and 146 $ft^2$/hr, respectively, which was higher than most other media tested, such as steel grit with a cleaning rate of 44 $ft^2$/hr and silica with a cleaning rate of 74 $ft^2$/hr. Additionally, both Media A and Media B performed above the threshold value of the coal slag abrasive media. As shown, "Coal Fine" achieved a cleaning rate of 90 $ft^2$/hr.

Figure 8:
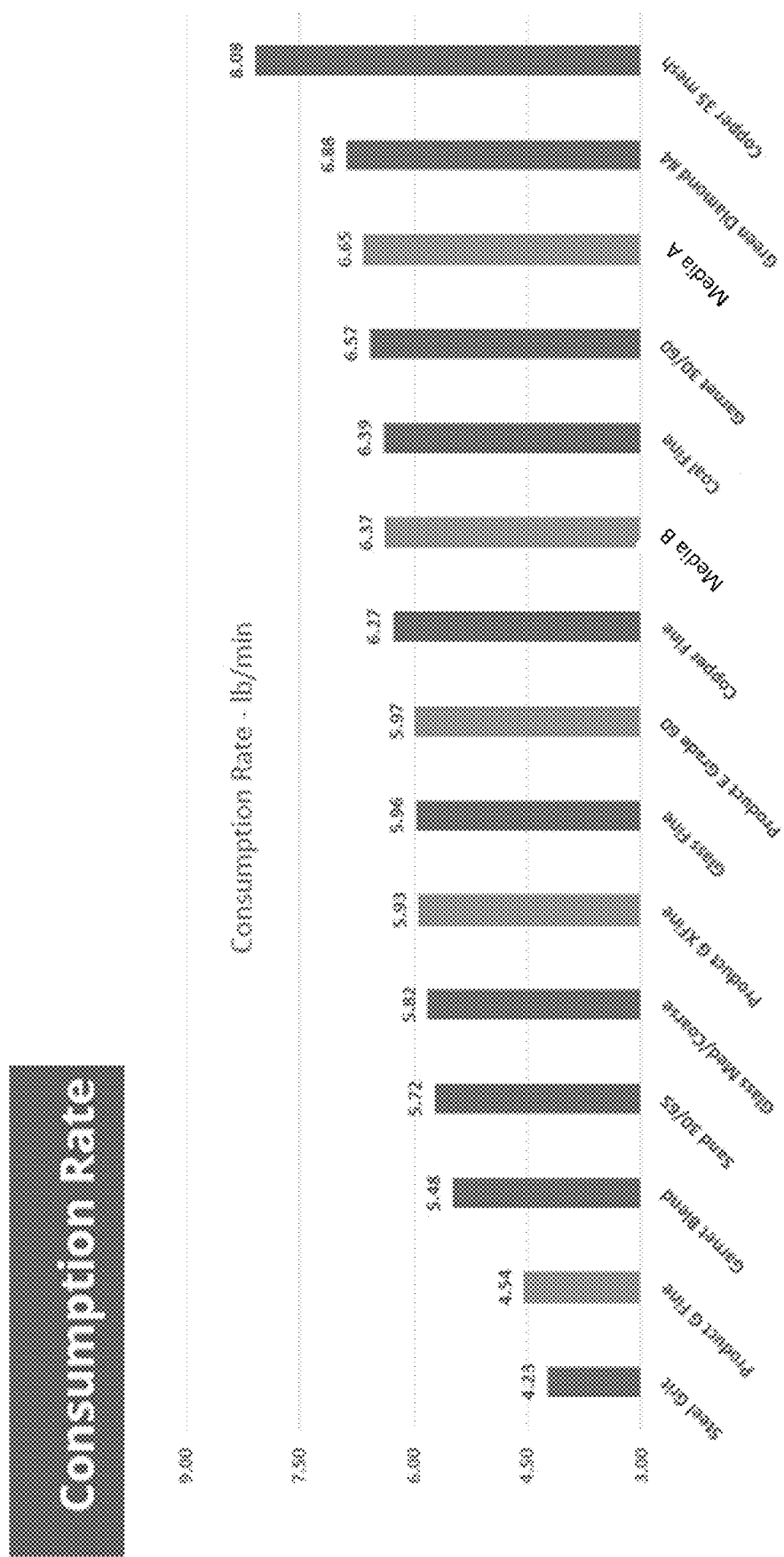
FIG. 8 is a diagram showing the consumption rate of some of the present blasting media compared to that of existing blast media.

Referring to FIG. 8, another characteristic tested was blast media consumption rate. The consumption rate was the rate at which air is consumed when using blast media, which is related to abrasive flow rate and informs the efficacy of the blast media. As shown the consumption rate for Media A and Media B was 6.65 lb/min and 6.37 lb/min, respectively. This was a significant improvement over the consumption rates of over half the other blast media tested (including steel grit at 4.23 lb/min), and was in line with the threshold value of the Coal Fine at 6.39 lb/min.

Figure 9:
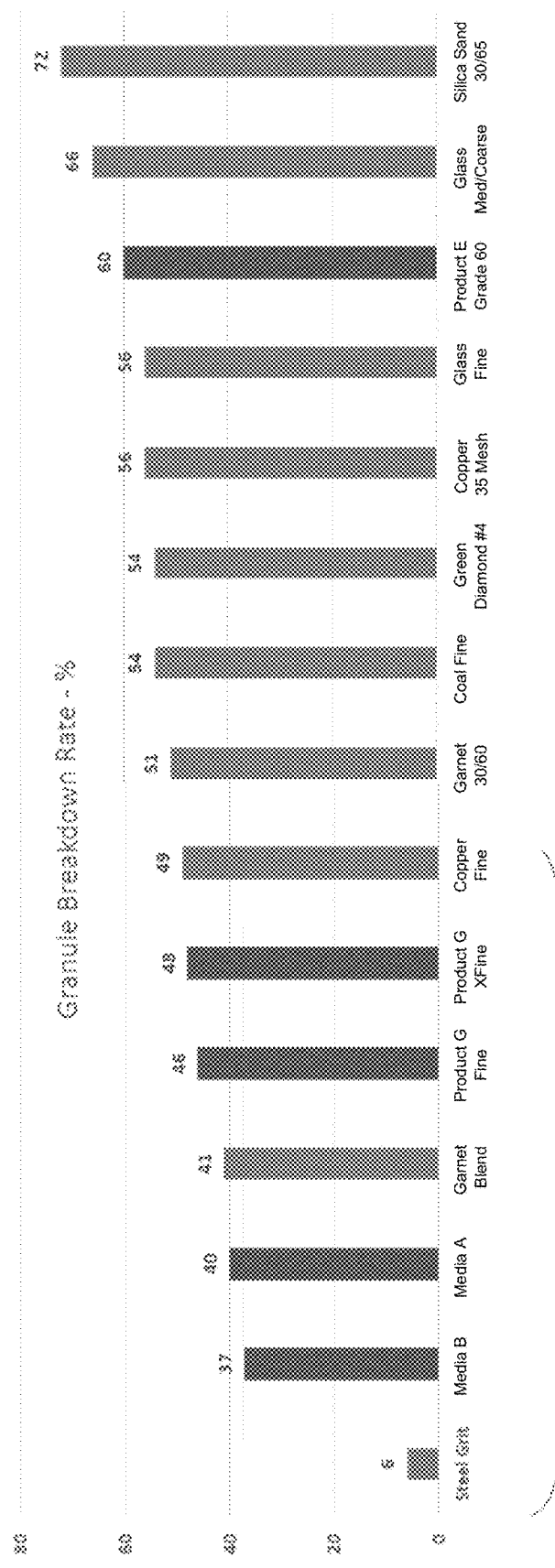
FIG. 9 is a diagram showing the rate of granule breakdown of some of the present blasting media compared to that of existing blast media.

Referring to FIG. 9, the granule breakdown rate was also tested, which is an indicator of efficacy and environmental-friendliness and informs whether the blast media may be reused. As indicated by FIG. 9, materials with a breakdown rate of less than 50% are eligible for reuse. Due to their angular morphology—which also contributed to the above-described improved cleaning and consumption rates—the Media A and Media B particles had relatively high structural integrity such that they broke at a much slower rate during abrasive blasting. As shown, Media A and Media B yielded breakdown rates of 40% and 37%, respectively, below the 50% threshold for reuse. Both Media A and Media B performed better than the threshold value of the Coal Fine granule breakdown rate of 54%.

Figure 10:
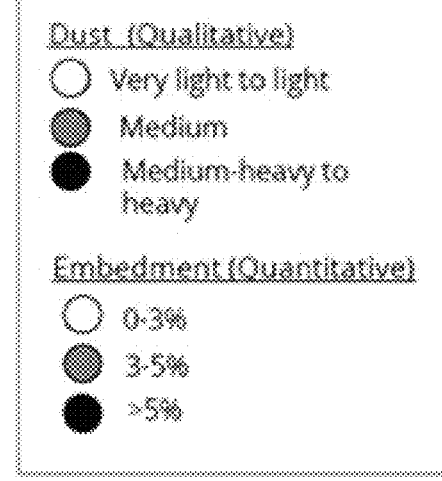
FIG. 10 is a diagram of dusting and embedment qualities of one of the present blasting media compared to that of existing blast media.

Another indicator of efficacy for blast media is how much the blast media product is present as a dust over the material being blasted (a qualitative measurement) and how much the blast media product embeds itself into the material being blasted (a quantitative measurement). The more dust present, the less effective the blast media. Furthermore, the more media embedment, the less effective the blast media is, with blast media embedding greater than 5% being less effective and blast media with embedding of 0-3% being effective. FIG. 10 shows such dusting and embedment characteristics for Media A and Media B compared to other blasting media. As shown, Media A and Media B beneficially exhibited very light to light dusting. Media A and Media B also embedded only 0-3%, which was the most effective category.

Figure 11:
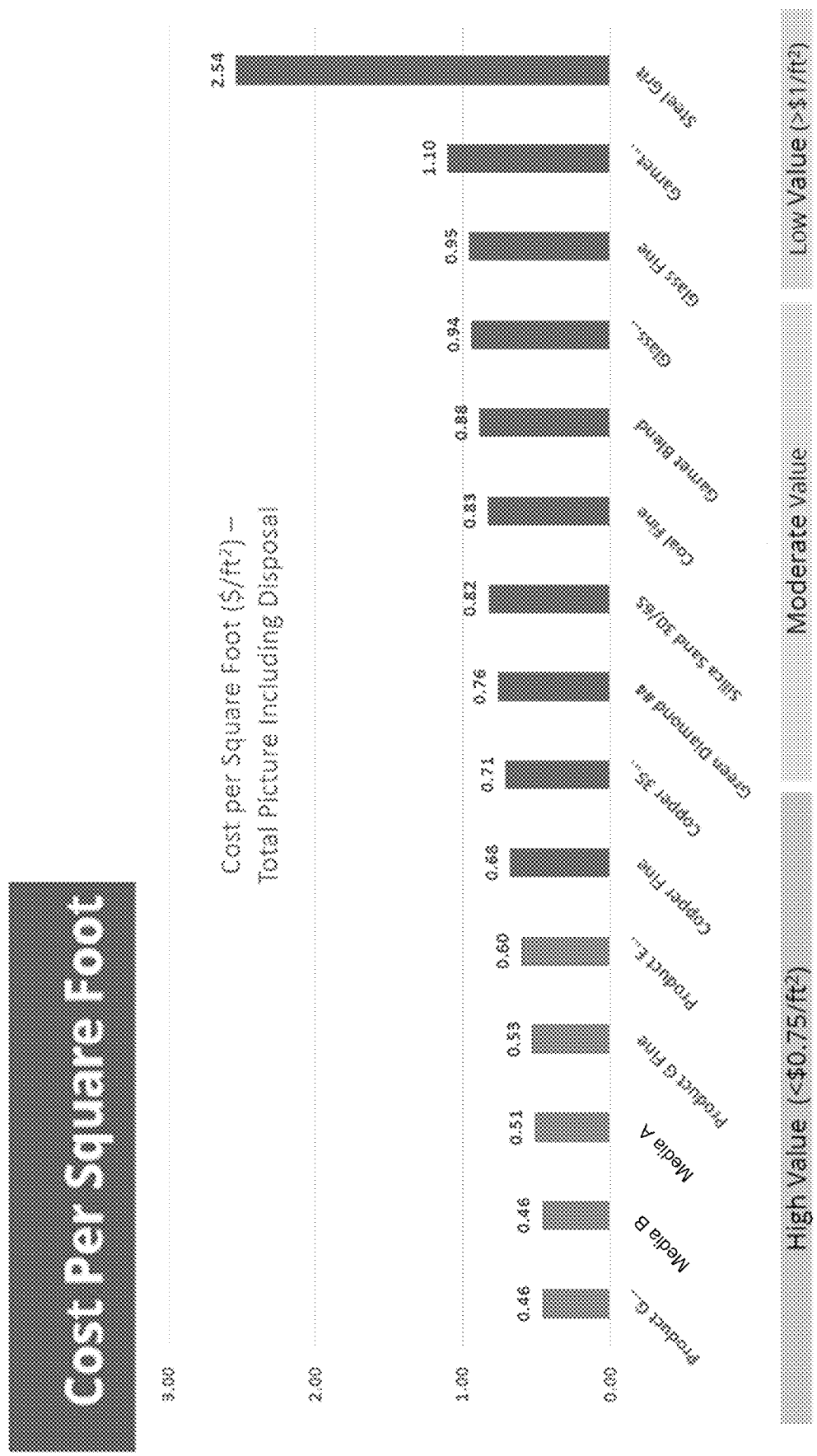
FIG. 11 is a diagram of cost per square foot of some of the present blasting media compared to that of existing blast media.

Another characteristic assessed was cost. FIG. 11 shows the blasting media cost per square foot for Media A and Media B compared to other blasting media. As shown, Media A and Media B had a lower cost per square foot compared to most existing media that were tested, putting Media A and Media B demetallized slag blast media in the "High Value" category. Thus, demetallized slag is shown to be a high value and high efficacy abrasive blast media which can perform as a substitute for coal slag abrasive blast media.

Example 2

Exemplary Formulation

Steel slag having the ingredients disclosed herein was used to produce demetallized slag. The formulation in Table 1 is an example of a steel slag after demetallization thereof.

TABLE 1

| Ingredient | % Concentration (by weight) |
|---|---|
| Iron (III) oxide | 32 |
| Calcium oxide | 23 |
| Silicon dioxide | 17 |
| Aluminum oxide | 10 |
| Magnesium oxide | 9 |
| Manganese (II) oxide | 5 |
| Chromium (III) oxide | 2 |
| Titanium dioxide | 0.5 |
| Sodium oxide | 0.3 |
| Phosphorous pentoxide | 0.3 |
| Potassium oxide | 0.3 |
| Vanadium oxide | 0.2 |
| Barium oxide | 0.1 |
| Strontium oxide | 0.1 |
| Zinc oxide | 0.04 |
| Copper (II) oxide | 0.03 |
| Zirconium oxide | 0.02 |
| Excipients* | q.s. |

*Excipients can be added, for example, to modify the rheological properties of the composition. The presence or amount of water can be varied.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means plus- or step-plus-function limitations, unless such a limitation is explicitly recited in a given claim using the phrase(s) "means for" or "step for," respectively.

The invention claimed is:

1. A method for making a granular material, the method comprising:
    crushing demetallized steel slag particles with one or more crushers, wherein:
        prior to the crushing, ones of the demetallized steel slag particles having a size that is less than or equal to 2 inches account for at least 90% of the demetallized steel slag particles; and
        a metallic iron content of the demetallized steel slag particles, by weight, is less than or equal to 10%; and
    screening the crushed demetallized steel slag particles with one or more screens to separate the demetallized steel slag particles into two or more fractions, the granular material comprising at least one of the fractions of the demetallized steel slag particles;
    wherein crushing and screening the demetallized steel slag particles is performed such that at least 90% of the demetallized steel slag particles of the granular material have a size that is less than or equal to 1.25 mm; and
    wherein the demetallized steel slag particles comprise electric arc furnace slag that is substantially free of ladle slag;
    wherein an iron (III) oxide ($Fe_2O_3$) content of the steel slag particles, by weight, is greater than or equal to 5%; and
    the demetallized steel slag particles have an angular morphology such that in a cleaning process in which the demetallized steel slag particles is ejected at a pressure of 100 pounds per square inch from a No. 4 blast nozzle positioned 18 inches away from a surface of a hot rolled carbon steel substrate that includes mill scale, the demetallized steel slag particles is configured to clean the surface of the hot rolled carbon steel substrate at a cleaning rate of at least 135 square feet of the surface per hour ($ft^2/hr$) such that the surface complies with SSPC-SP 10.

2. The method of claim 1, wherein:
    the one or more crushers comprise primary and secondary crushers;
    crushing the demetallized steel slag particles comprises crushing at least one of the fractions of the screened demetallized steel slag particles with the secondary crusher; and
    screening the demetallized steel slag particles comprises screening the demetallized steel slag particles crushed with the secondary crusher.

3. The method of claim 1, wherein each of the crusher(s) comprises a vertical shaft impact crusher.

4. The method of claim 1, wherein crushing and screening the demetallized steel slag particles is performed such that ones of the demetallized steel slag particles of the granular material having a size that is less than or equal to 0.90 mm account for at least 90% of the demetallized steel slag particles of the granular material.

5. The method of claim 1, comprising drying the demetallized steel slag particles.

6. The method of claim 5, wherein drying is performed such that less than or equal to 0.50% of the demetallized steel slag particles, by weight, comprises water.

7. The method of claim 1, comprising making the demetallized steel slag particles at least by:
removing one or more metallic components from furnace steel slag particles at least by passing the furnace steel slag particles through a demetallizer one or more times;
crushing the furnace steel slag particles; and
screening the crushed furnace steel slag particles with one or more screens to separate the crushed furnace steel slag particles into two or more fractions, the demetallized steel slag particles comprising at least one of the fractions.

8. The method of claim 7, wherein making the demetallized steel slag particles includes:
after passing the furnace steel slag particles through the demetallizer at least once, screening the furnace steel slag particles with one or more screens to separate the furnace steel slag particles into two or more fractions, wherein ones of the particles of a first one of the fractions having a size that is greater than or equal to 8 inches account for at least 90% of the particles of the first fraction; and
removing the metallic component(s) includes passing the first fraction through the demetallizer.

9. The method of claim 7, wherein removing the metallic component(s) is performed with one or more magnets of the demetallizer.

10. The method of claim 7, wherein crushing the furnace steel slag particles is performed with a jaw crusher.

11. The method of claim 7, wherein the furnace steel slag particles comprise calcium oxide (CaO), iron (III) oxide ($Fe_2O_3$), silicon dioxide ($SiO_2$), aluminum oxide ($Al_2O_3$), magnesium oxide (MgO), and manganese (II) oxide (MnO).

12. A plurality of steel slag particles, wherein:
at least 90% of the steel slag particles have a size that is less than or equal to 1.25 mm and greater than or equal to 0.14 mm;
a metallic iron and an iron (II) oxide (FeO) content of the steel slag particles, by weight, is less than or equal to 5%;
an iron (III) oxide ($Fe_2O_3$) content of the steel slag particles, by weight, is greater than or equal to 5%;
a manganese (II) oxide (MnO) content of the steel slag particles, by weight, is greater than or equal to 5%; and
the steel slag particles comprise electric arc furnace slag that is substantially free of ladle slag; and
the steel slag particles comprise calcium oxide (CaO), silicon dioxide ($SiO_2$), aluminum oxide ($Al_2O_3$), and magnesium oxide (MgO) and wherein the aluminum oxide content of the steel slag particles, by weight, is at least 10%.

13. The steel slag particles of claim 12, wherein at least 90% of the steel slag particles have a size that is less than or equal to 0.90 mm and greater than or equal to 0.14 mm.

14. The steel slag particles of claim 12, wherein the metallic iron and an iron (II) oxide content of the steel slag particles, by weight, is less than or equal to 3%.

15. An abrasive blast media comprising:
a plurality of steel slag particles, wherein:
at least 90% of the steel slag particles have a size that is less than or equal to 1.25 mm and greater than or equal to 0.14 mm;
a metallic iron content of the steel slag particles, by weight, is less than or equal to 10%;
an iron (III) oxide ($Fe_2O_3$) content of the steel slag particles, by weight, is greater than or equal to 5%; and
the steel slag particles have an angular morphology such that in a cleaning process in which the abrasive blast media is ejected at a pressure of 100 pounds per square inch from a No. 4 blast nozzle positioned 18 inches away from a surface of a hot rolled carbon steel substrate that includes mill scale, the abrasive blast media is configured to clean the surface of the hot rolled carbon steel substrate at a cleaning rate of at least 135 square feet of the surface per hour ($ft^2$/hr) such that the surface complies with SSPC-SP 10.

16. The abrasive blast media of claim 15, wherein in the cleaning process a granule breakdown rate of the abrasive blast media is less than 50 percent.

17. The abrasive blast media of claim 15, wherein in the cleaning process the abrasive blast media is ejected from the nozzle at a consumption rate of between 6.0 and 7.0 pounds per minute (lb/min).

18. The abrasive blast media of claim 15, wherein the abrasive blast media consists essentially of the plurality of steel slag particles.

19. The abrasive blast media of claim 15, wherein:
less than 1.0%, by weight, of the steel slag particles comprise water;
a manganese (II) oxide (MnO) content of the steel slag particles, by weight, is greater than or equal to 5%; and
the metallic iron content and an iron (II) oxide (FeO) content of the steel slag particles, by weight, is less than or equal to 5%.

* * * * *